US011252185B2

(12) United States Patent
Dalek et al.

(10) Patent No.: US 11,252,185 B2
(45) Date of Patent: Feb. 15, 2022

(54) GRAPH STREAM MINING PIPELINE FOR EFFICIENT SUBGRAPH DETECTION

(71) Applicant: NTT Security Corporation, Tokyo (JP)

(72) Inventors: Daniel Dalek, Palo Alto, CA (US); Mattias Harrysson, Palo Alto, CA (US); Himanshu Sinha, Palo Alto, CA (US); Kenji Takahashi, Palo Alto, CA (US)

(73) Assignee: NTT SECURITY CORPORATION, East Palo Alto, CA (US)

( * ) Notice: Subject to any disclaimer, the term of this patent is extended or adjusted under 35 U.S.C. 154(b) by 317 days.

(21) Appl. No.: 16/368,805

(22) Filed: Mar. 28, 2019

(65) Prior Publication Data

US 2020/0358815 A1  Nov. 12, 2020

(51) Int. Cl.
| | |
|---|---|
| *H04L 29/06* | (2006.01) |
| *G06F 16/901* | (2019.01) |
| *H04L 12/26* | (2006.01) |
| *H04L 29/12* | (2006.01) |
| *H04L 43/045* | (2022.01) |
| *H04L 61/5007* | (2022.01) |

(52) U.S. Cl.
CPC ...... *H04L 63/1466* (2013.01); *G06F 16/9024* (2019.01); *H04L 43/045* (2013.01); *H04L 61/2007* (2013.01); *H04L 63/1416* (2013.01); *H04L 63/20* (2013.01)

(58) Field of Classification Search
CPC ............... H04L 63/1466; H04L 43/045; H04L 61/2007; H04L 63/1416; H04L 63/20; H04L 69/22; G06F 16/9024; G06F 21/552
See application file for complete search history.

(56) References Cited

U.S. PATENT DOCUMENTS

| | | | |
|---|---|---|---|
| 6,575,902 B1 | 6/2003 | Burton | |
| 7,225,343 B1 | 5/2007 | Honig et al. | |
| 7,912,698 B2 | 3/2011 | Statnikov et al. | |
| 8,135,718 B1 | 3/2012 | Das et al. | |
| 8,402,543 B1 | 3/2013 | Ranjan et al. | |
| 8,762,298 B1 | 6/2014 | Ranjan et al. | |
| 9,144,389 B2 | 9/2015 | Srinivasan et al. | |
| 9,183,387 B1 | 11/2015 | Altman et al. | |

(Continued)

FOREIGN PATENT DOCUMENTS

| | | |
|---|---|---|
| JP | 2003242124 A | 8/2003 |
| JP | 2007318745 A | 12/2007 |

(Continued)

OTHER PUBLICATIONS

Website Traffic, Statistics and Analytics @ Alexa—Webpage: https://www.alexa.com/siteinfo retrieved from the internet dated Jan. 30, 2018 (5 pages.).

(Continued)

*Primary Examiner* — Joe Chacko

(74) *Attorney, Agent, or Firm* — Manatt, Phelps & Phillips LLP

(57) ABSTRACT

A graph stream mining processing system and method may be used to analyze the data from a plurality of data streams. In one embodiment, the graph stream mining processing system and method may be used to detect one or more candidate botnet malicious nodes.

10 Claims, 11 Drawing Sheets

(56) References Cited

U.S. PATENT DOCUMENTS

| | | | |
|---|---|---|---|
| 9,674,880 B1 | 6/2017 | Egner et al. | |
| 9,769,189 B2 | 9/2017 | Mohaisen et al. | |
| 9,787,640 B1 | 10/2017 | Xie et al. | |
| 10,566,084 B2 | 2/2020 | Kataoka | |
| 10,742,669 B2 | 8/2020 | Takahashi et al. | |
| 2004/0128535 A1 | 7/2004 | Cheng | |
| 2006/0187060 A1 | 8/2006 | Colby | |
| 2007/0256141 A1 | 11/2007 | Nakano et al. | |
| 2009/0066521 A1 | 3/2009 | Atlas et al. | |
| 2009/0319457 A1 | 12/2009 | Cheng et al. | |
| 2010/0066509 A1 | 3/2010 | Okuizumi et al. | |
| 2010/0286572 A1 | 11/2010 | Moersdorf et al. | |
| 2012/0005755 A1 | 1/2012 | Kitazawa et al. | |
| 2013/0074186 A1 | 3/2013 | Muttik | |
| 2013/0195326 A1 | 8/2013 | Bear et al. | |
| 2015/0088791 A1 | 3/2015 | Lin et al. | |
| 2017/0063893 A1 | 3/2017 | Franc et al. | |
| 2017/0251005 A1* | 8/2017 | Niv | H04L 63/1425 |
| 2017/0318033 A1 | 11/2017 | Holland et al. | |
| 2018/0069885 A1* | 3/2018 | Patterson | H04L 63/1416 |
| 2018/0083988 A1 | 3/2018 | Kataoka et al. | |
| 2018/0329958 A1* | 11/2018 | Choudhury | G06F 16/2343 |
| 2019/0052652 A1* | 2/2019 | Takahashi | H04L 63/0236 |
| 2019/0132342 A1 | 5/2019 | Arlitt et al. | |
| 2019/0305957 A1 | 10/2019 | Reddy et al. | |

FOREIGN PATENT DOCUMENTS

| | | |
|---|---|---|
| JP | 2008049602 A | 3/2018 |
| JP | 2018148267 A | 9/2018 |
| WO | WO2008117544 A | 10/2008 |
| WO | WO2019032745 A1 | 2/2019 |

OTHER PUBLICATIONS

Kegelman, J.C., et al., entitled "Insights into vehicle trajectories at the handling limits: analyzing open data from race car drivers; Taylor & Francis, Vehicle System Dynamics" dated Nov. 3, 2016 (18 pages.).

Theodosis et al., "Nonlinear Optimization of a Racing Line for an Autonomous Racecar Using Professional Driving Techniques", dated Oct. 2012, 7 pages, Citation and abstract, retrieved from the web at: https://www.researchgate.net/publication/267650184.

Tulabandhula, T. et al. "Tire Changes, Fresh Air, and Yellow Flags: Challenges in Predictive Analytics for Professional Racing" MIT, dated Jun. 2014 (17 pages.).

Takagahara, K. et al.: "hitoe"—A Wearable Sensor Developed through Cross-industrial Collaboration, NTT Technical Review, dated Sep. 4, 2014 (5 pages.).

Lee, J.H., et al., Development of a novel Tympanic temperature monitoring system for GT car racing athletes—Abstract Only—pp. 2062-2065, dated 2013 (3 pages.) retrieved from the web at https://link.springer.com/chapter/10.1007/978-3-642-29305-4_541.

Kataoka et al., "Mining Muscle Use Data for Fatigue Reduction in IndyCar," MIT Sloan Sports Analytics Conference (Mar. 4, 2017), pp. 1-12. Retrieved from the Internet. http://www.sloansportsconference.com/wp-content/uploads/2017/02/1622.pdf.

Malik et al. "Automatic training data cleaning for text classification." In: 2011 IEEE 11th international conference on data mining workshops. Dec. 11, 2011 (Dec. 11, 2011) Retrieved on Aug. 2, 2019 (Aug. 2, 2019), entire document http://www1.cs.columbia.edu/-hhm2104/papers/atdc.pdf.

Chawla et al., "SMOTE: synthetic minority over-sampling technique." In: Journal of artificial intelligence research. Jun. 2, 2002 (Jun. 2, 2002) Retrieved on Aug. 2, 2019 (Aug. 2, 2019), entire document), 37 pages. https://www.jairorg/index.php/jaidarticle/download/10302J24590).

Yen et al., "Cluster-based under-sampling approaches for imbalanced data distributions." In: Expert Systems with Applications. Apr. 2009 (Apr. 2009) Retrieved on Aug. 2, 2019 (Aug. 2, 2019), entire document), 10 pages. http://citeseemist.psu.edu/viewdoc/download?doj=10.1.1.454.35308,rep=rep1&type=pdf.

How to handle Imbalanced Classification Problems in machine learning? In: Analytics Vidhya. Mar. 17, 2017 (Mar. 17, 2017), 46 pages. Retrieved on Aug. 2, 2019 (Aug. 2, 2019), entire document https://www.analyticsvidhya.com/blog/2017/03/imbalanced-classification-problem/.

* cited by examiner

| Start time | Duration | Source IP address | Source port number | Destination IP address | Destination port number | Number of packets | Size of packets in total (in Bytes) |
|---|---|---|---|---|---|---|---|
| 2019-1-31 00:00:00 | 0.001 second | xxx.23.23.23 | 80 | yyy.33.44.55 | 8080 | 3 | 87 | yyy.33.44.55:8080 xxx.23.23.23:80

GRAPH STREAM MINING PIPELINE FOR EFFICIENT SUBGRAPH DETECTION

FIELD

The disclosure relates generally to graph analysis and in particular to the detection of subgraphs constructed for specific purposes and/or causes.

BACKGROUND

Graph mining is widely used in various domains, including bioinformatics, program flow analysis, computer networks, and cybersecurity. In graph mining, data sets are represented as graphs and analyzed to gain knowledge from the graphs. Graph stream mining is a type of graph mining that analyzes the steams of graph data. Graph stream mining may be used, for example, for the detection of "botnets" in the cybersecurity domain. A botnet is a group of malicious computers controlled and used by attackers over the internet in many ways. Today many cybersecurity attacks use botnets. For example, for major Distributed Denial of Services (DDoS) attacks, tens of thousands of malicious computers are used. Many of those malicious computers are owned by consumers and infected with malware and abused by the attackers. Botnets affect internet services and therefore are becoming a huge threat to society worldwide. Thus, it is important to detect the structures of botnets and identify their constituents so that computer networks can be protected from botnet attacks and ultimately the botnets can be identified and disabled.

Internet Service Providers (ISPs) usually collect network flow data ("netflow"), which are records of communications between computers n the internet, i.e., the historical data showing the computers communicating with each other. Network flow data can be expressed as directed graphs, in which a computer is represented as a node and a flow (or communications between computers) as an edge. The network flow data represented as graphs are then analyzed to detect botnets in the internet. Such detection is time consuming and error-prone because the sheer volume and the complexity of the data to be analyzed.

Thus, a technical problem exists with known and existing systems and methods that carry out graph mining since they are too inefficient to apply to a large set of data updated continuously, such as network flow data, and thus cannot be used to effectively detect botnets, for example. Thus, it is desirable to provide a system and method for graph mining that addresses the inefficiency and scalability problems and provides a technical solution to this technical problem and it is to this end that the disclosure is directed.

DETAILED DESCRIPTION OF ONE OR MORE EMBODIMENTS

The disclosure is particularly applicable to a graph stream mining pipeline system having the elements disclosed below for use in botnet detection and it is in this context that the disclosure will be described. It will be appreciated, however, that the system and method has greater utility since the graph stream mining pipeline system may be used for various types of datasets and is not limited to the botnet example discussed below and the graph stream mining pipeline system and method may be implemented differently than disclosed below and those other implementations are within the scope of the disclosure.

The disclosed system and method provides a technical solution to the above described technical problem with the inefficiency and scalability by significantly parallelizing and pipelining the processes. Thus, system and method can be used in any graph streaming mining tasks to detect nodes relevant to given seed nodes from a large amount of graph streaming data. Thus, the disclosed system and method enable efficient and scalable pipelines that may then be used as graph stream mining including yet to be developed graph streaming mining that can take advantage of the efficient and scalable processing capabilities implemented by the disclosed system and method.

Figures 8, 9:
FIG. 8 is an example of network flow data.
FIG. 9 is an example of a network flow graph generated from the exemplary network flow data.

Hereafter, the illustrative example of the graph stream mining is a system that detects botnets used for Trickbot malware. The botnets consist of victims, command & controller servers (or C&C server), and a botmaster. Victims are computers that are infected by the Trickbot malware. For example, a victim can be a computer used by an employee of a bank and infected by malware attached to an impersonated e-mail message. The victim steals and sends, for example, customers' account numbers and passwords to the criminals behind the botnets. C&C servers are computers that control victims by sending commands. Botmasters are the computers that control the C&C servers. In this example, we represent network flow data as directed graphs that consist of nodes as computers and edges as network flow between computers. For example, FIG. 8 shows an example of network flow data that shows information about a data flow between two nodes (a source node at the xxx.23.23.23 IP address and a destination node at the yyy.33.44.55 IP address). The network flow data may also include a start time, a duration, source and destination port numbers, a number of packets and size of the packets in the data flow. Based on the above, a network flow graph as shown in FIG. 9 is generated from the exemplary network flow data where each node in the graph is a node (source or destination in the network flow data) with an identifier that is the IP address and an edge between the nodes is the data flow. These graphs are constantly changed over time and thus requires the disclosed graph stream mining for botnet detection.

Figure 1A:
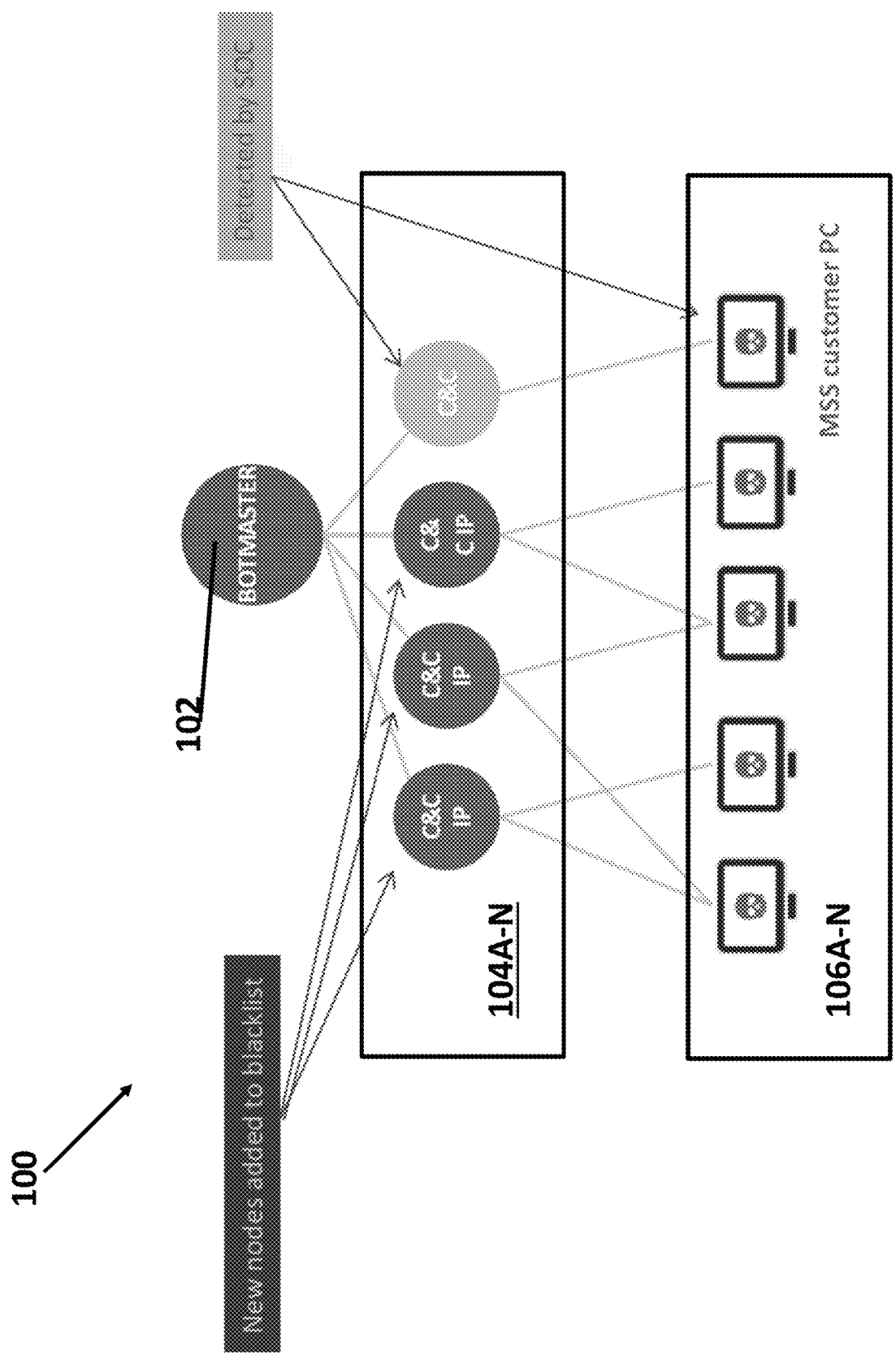
FIG. 1A illustrates an example of a botnet that may be detected using a graph stream mining processing system.

FIG. 1A illustrates an example of a generic botnet 100 that may be detected using a graph stream mining processing system. As shown in FIG. 1A, the botnet 100 may include a group of malicious computers controlled and used by attackers over the internet in many ways and the goal is to detect/identify each malicious computer (and its IP address) that is part of the botnet. The botnet 100 may include a botmaster computer 102 that controls a plurality of command and control computers/servers 104A-N that may execute command and control software that controls a plurality of infected customer computers 106A-N that have installed malware that allows the C&C computers and the botmaster to control the customer computer. All of the computers shown in FIG. 1A are the group of malicious computers.

Figure 1B:
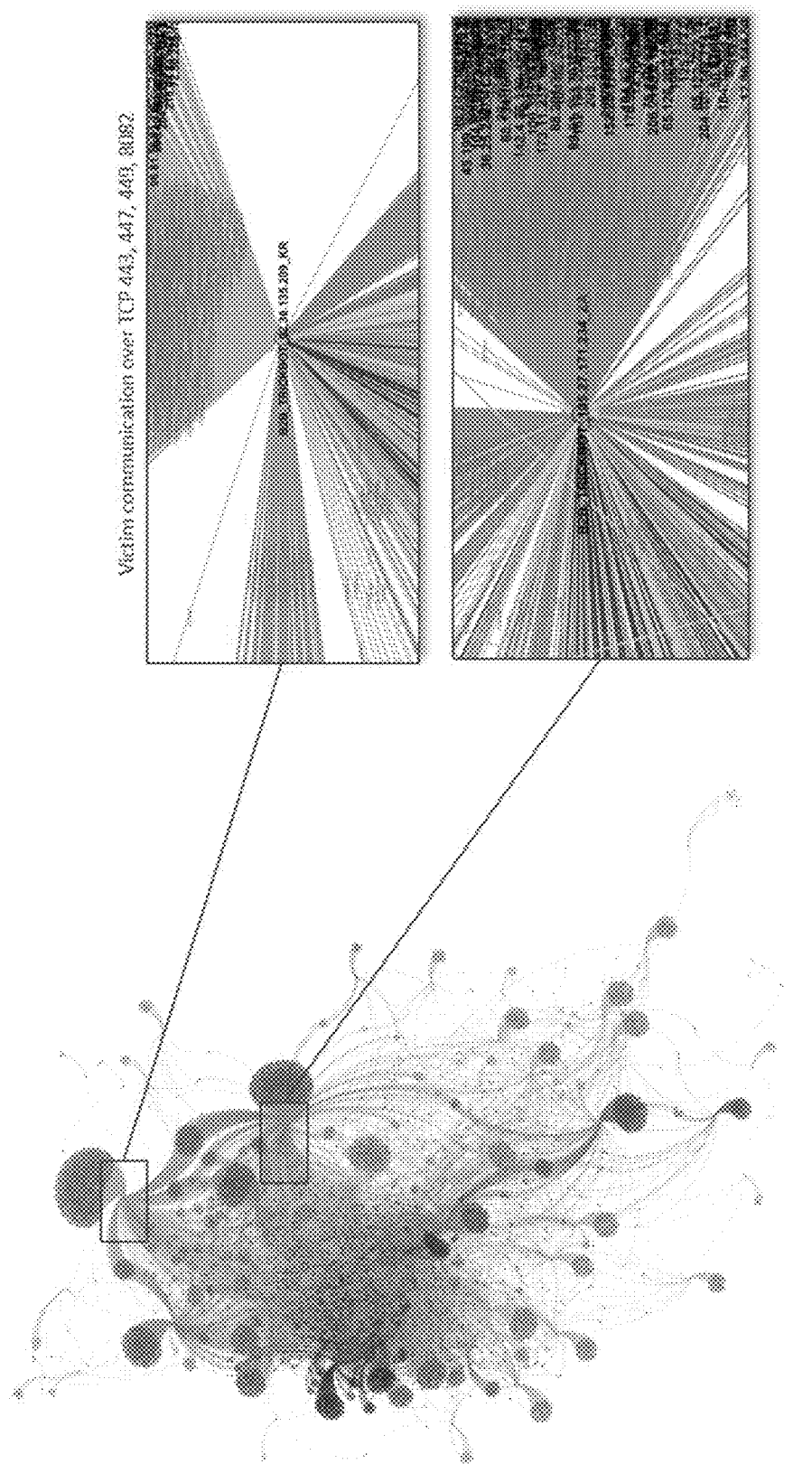
FIG. 1B illustrates a snapshot of the Trickbot botnet.

In computer security, it is desirable to be able to detect each or preferably all of the computers (and their IP addresses) that are part of the botnet in order to eliminate or reduce the threat of that botnet, such as the Trickbot mentioned above. An example of a snapshot of the Trickbot botnet is shown in FIG. 1B. In accordance with the graph stream mining processing system described below, the disclosed system may identify the C&C computer 104N (rightmost in FIG. 1) and, using that identified C&C computer and its IP address as a seed, detect the three other C&C computers/nodes shown in FIG. 1. Those previously unknown C&C nodes 104A-C can then be added to a blacklist/MSS. This is an example of what the results/data from the graph stream mining processing system may be used to accomplish.

Figure 2:
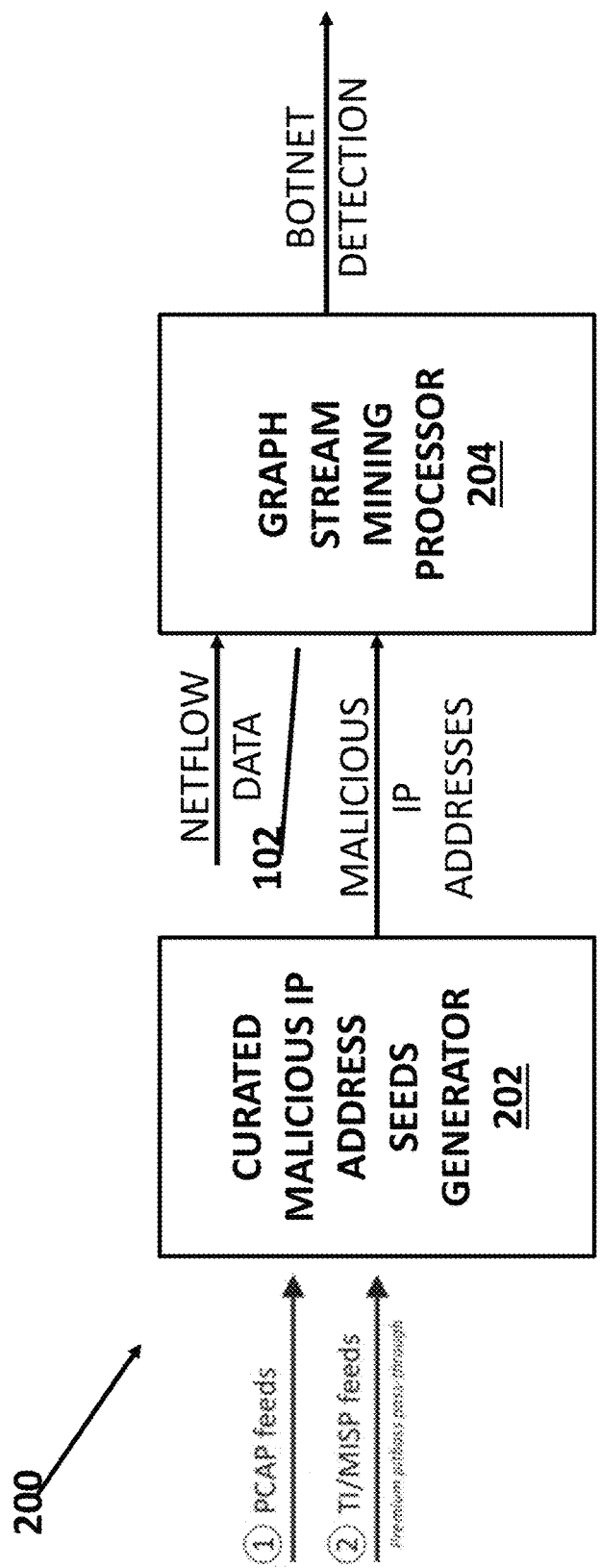
FIG. 2 illustrates an embodiment of a botnet detection system that includes the graph stream mining processing system.
Figure 3:
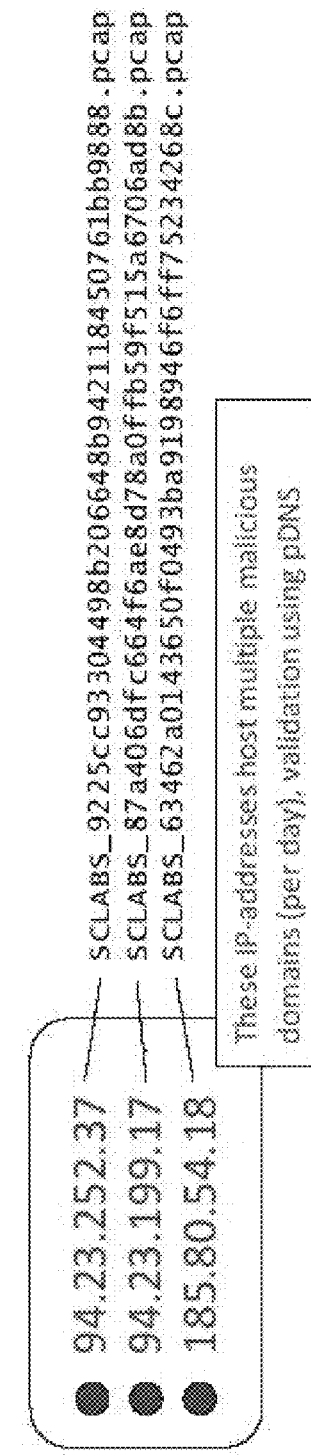
FIG. 3 illustrates an example malicious IP addresses seeds generated by the malicious seed generator in FIG. 2.

FIG. 2 illustrates an embodiment of a botnet detection system 200 that includes the graph stream mining processing system that can accomplish the botnet computers detection. The system 200 may have a curated malicious IP address seed generator 202 that receives PCAP feeds (packet data about networks) and TI/MISP feeds (open source threat intelligence) and generates one or more identified malicious IP addresses based on those feeds. Further details of the generator 202, its implementation and detailed operations are provided in U.S. patent application Ser. No. 15/996,213, filed Jun. 1, 2018 and entitled "Ensemble-Based Data Curation Pipeline for Efficient Label Propagation", the entirety of which is incorporated herein by reference. FIG. 3 illustrates an example malicious IP addresses seeds generated by the malicious seed generator in FIG. 2. As shown in the example in FIG. 3, one or more malicious IP addresses have been identified based on the feeds.

The one or more malicious IP addresses and known netflow data may be input into a graph stream mining processor 204 that outputs detected botnet computers in the example in which the system is being used to detect botnet and the botnet computers. The graph stream mining processor 204 and its elements are shown in more detail in FIGS. 4A and 4B.

Figure 4A:
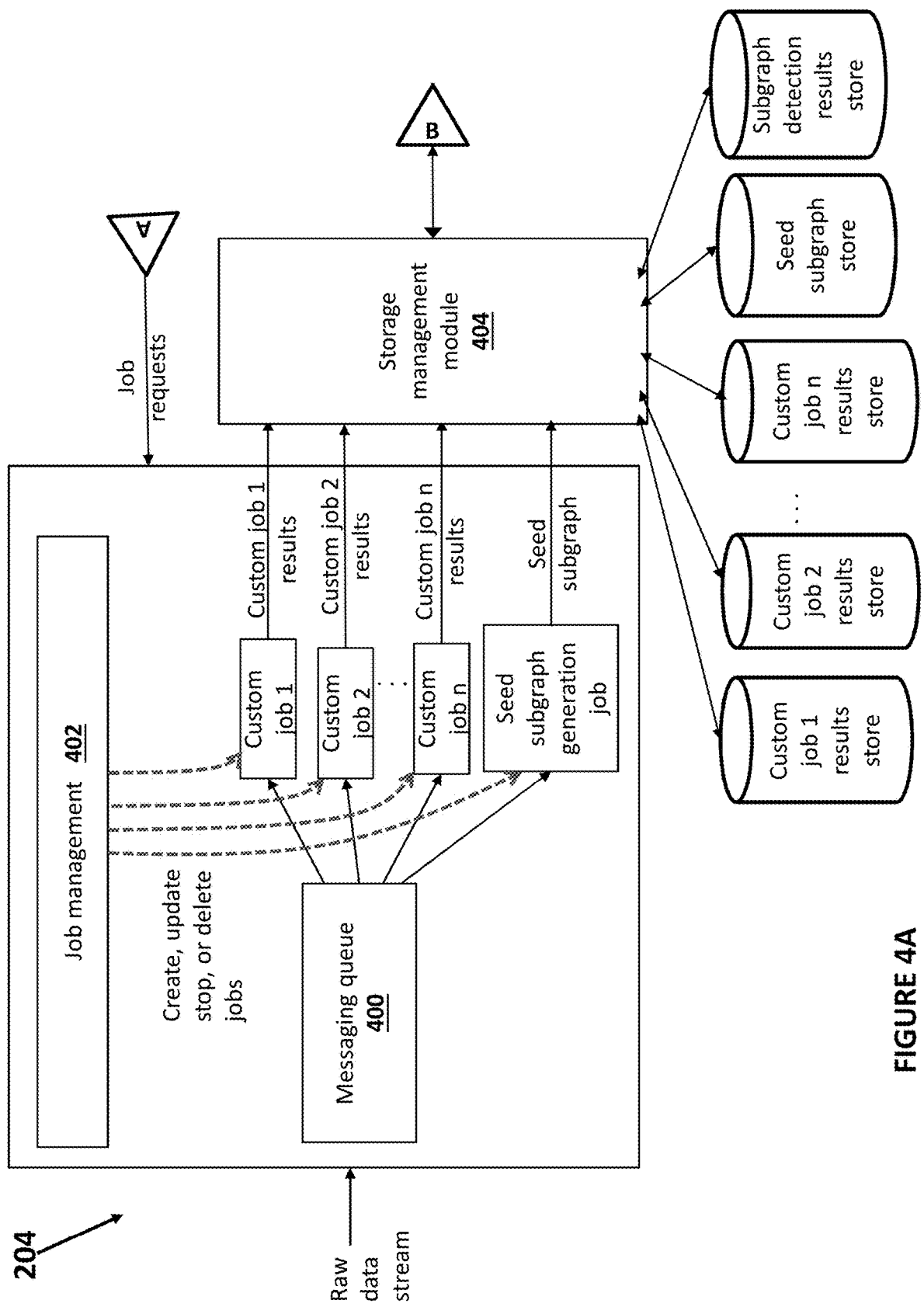
FIGS. 4A and 4B illustrate a graph stream mining processing system that may be used for botnet detection.
Figure 4B:
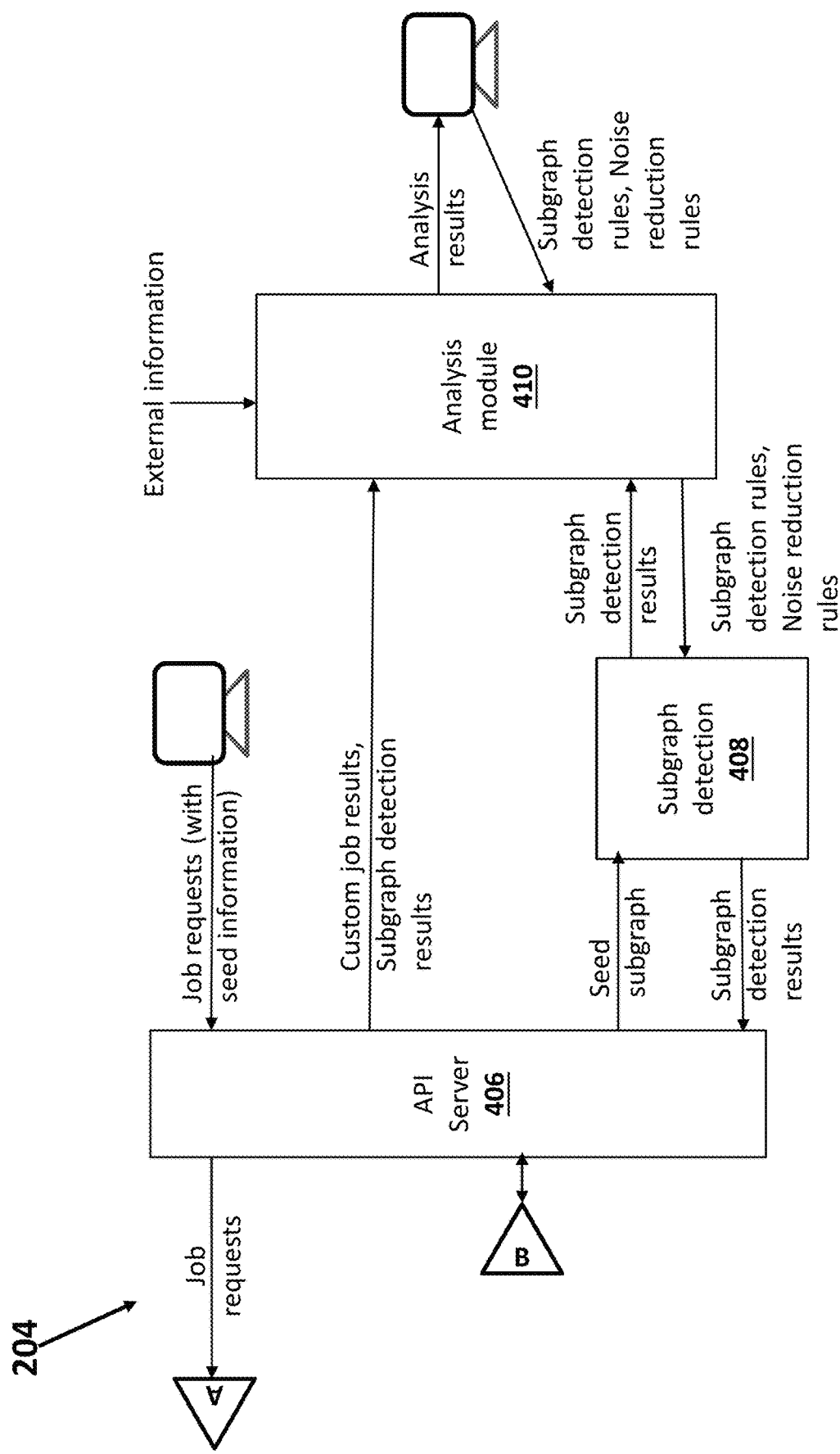

FIGS. 4A and 4B illustrate more details of the graph stream mining processing system/module 204 that may be used for botnet detection, but may be used for processing of other types of data and is not limited to botnet detection. The system 204 may receive one or more raw data streams (for example, network flow data for the bot net detection example) into a messaging queue 400 that distributes the incoming data streams to each job (Custom job 1, Custom job 2, . . . , Custom job n or a seed subgraph generation job.) The messaging queue is used to implement the parallel processing of the different jobs. In the botnet detection example implementation, each job of the parallel processed jobs may be extracting data, such as communication from/to a particular port, from the network flow data and/or detecting relevant subgraphs in the network flow data as described below. While the messaging queue is known for a way to implement parallel processing, it is not known for being used to perform parallel processing on network flow data or generating candidate nodes for a botnet in a botnet (or TrickBot) detection process. Each job (details of which are described below) may be managed by a job management module 402 that creates, updates, stops or deletes jobs. The job management module 4021 is also part of the implementation of parallel processing. The output of each of the jobs (results) may be stored by a storage management module 404 in one or more stores as shown in FIG. 4A and the storage management module 404 may perform data processing or data formatting operations on the data before it is stored in its store. The output of each job may be received in various formats, such as CSV/JSON, etc. or a compressed format, and output may be the data extracted from the network flow data or a seed subgraph.

In addition to the illustrative bot detection example, the system shown in FIGS. 4A and 4B may be used for any infinite data wherein the dataset includes relationships which can be represented as a graph. For example, other application example may include car traffic analysis for road optimization and planning based on car and road data streams and blood (and other body fluid) flow analysis for medical diagnosis.

Figure 10:
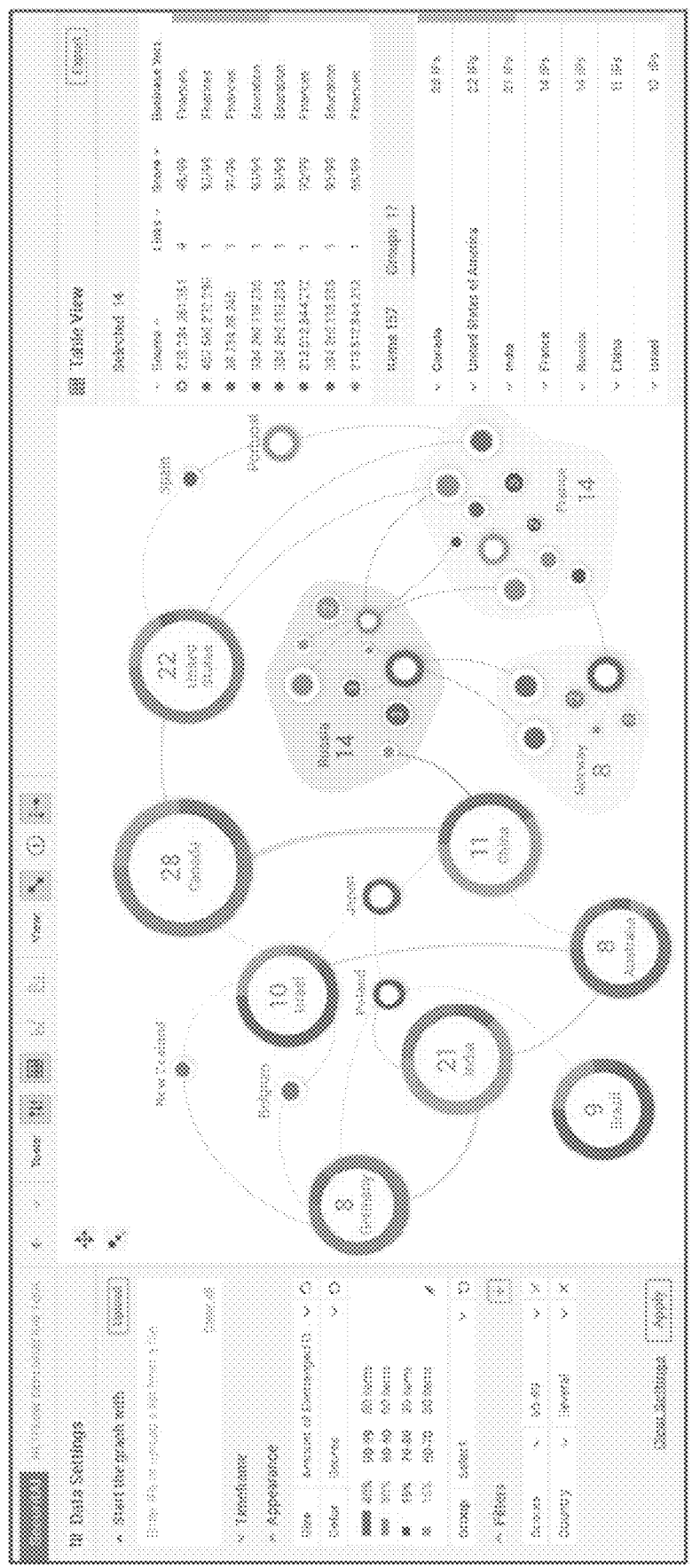
FIG. 10 illustrates an example of the user interface for the system showing data about a botnet.
Figure 11:
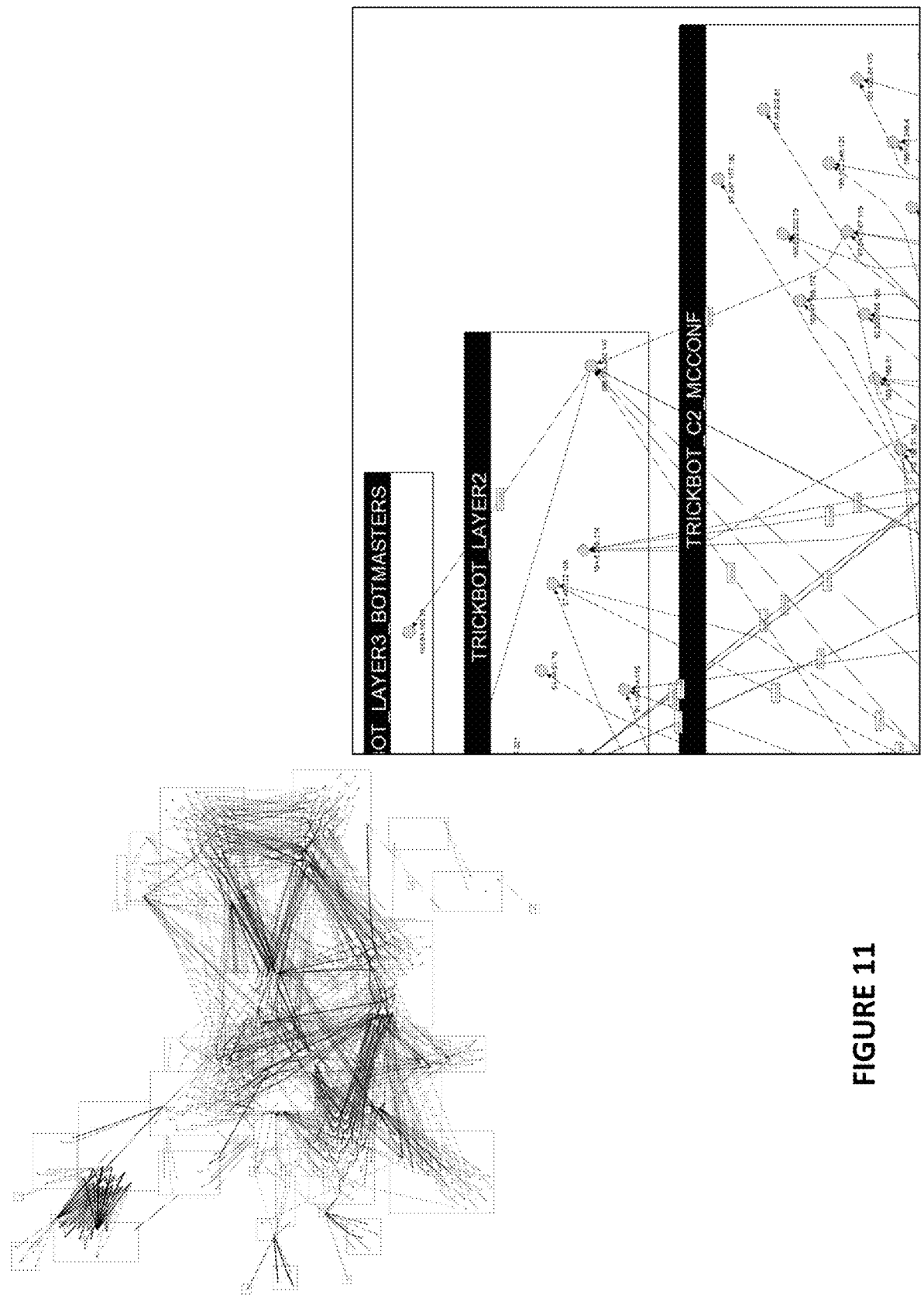
FIG. 11 illustrates an example of the user interface showing data about a TrickBot.

The system 204 may also have an API server 406 that sends the job requests for one or more users to the job manager 402 and communicates with the storage manager 404 about the job results. The API server 406 may communicate the custom job results and the subgraph detection results (from a subgraph detection module 408 whose results are stored by the storage manager 404) to an analysis module 410. The API server 406 may also communicate the seed subgraph to the subgraph detection module 408 whose operation is described in more detail below. The subgraph detection module 408 may return the subgraph detection results to the API server 406 and the analysis module 410. The analysis module 410 may perform analysis and validation to arrive at a result, such as a set of candidate botnet nodes in the bot net detection example, as described below in more detail. The analysis module 410 may display the analysis results to a user. Two examples of the graphical display from the analysis module 410 for botnet detection is shown in FIGS. 10 and 11. FIG. 10 graphically displays the nodes of a botnet by country and FIG. 11 shows the nodes in the different layers of the detected TrickBot.

There are existing system that use machine learning models based on statistical analysis of flow data to detect botnets, such as Bilge, Leyla, et al. "Disclosure: detecting botnet command and control servers through large-scale netflow analysis." *Proceedings of the 28th Annual Computer Security Applications Conference.* ACM, 2012. These systems have three major problems: (1) longer time to get final results, (2) higher false positive rate, and (3) poor interpretability. The disclosed graph stream mining method and system (1) produces final results in real time by eliminating needs of calculating statistics and storing & processing seed subgraphs, (2) achieves lower false positive rate by using detection rules as needed, and (3) demonstrates higher interpretability by using and thus enabling to attribute results to specific human readable rules.

Figure 5:
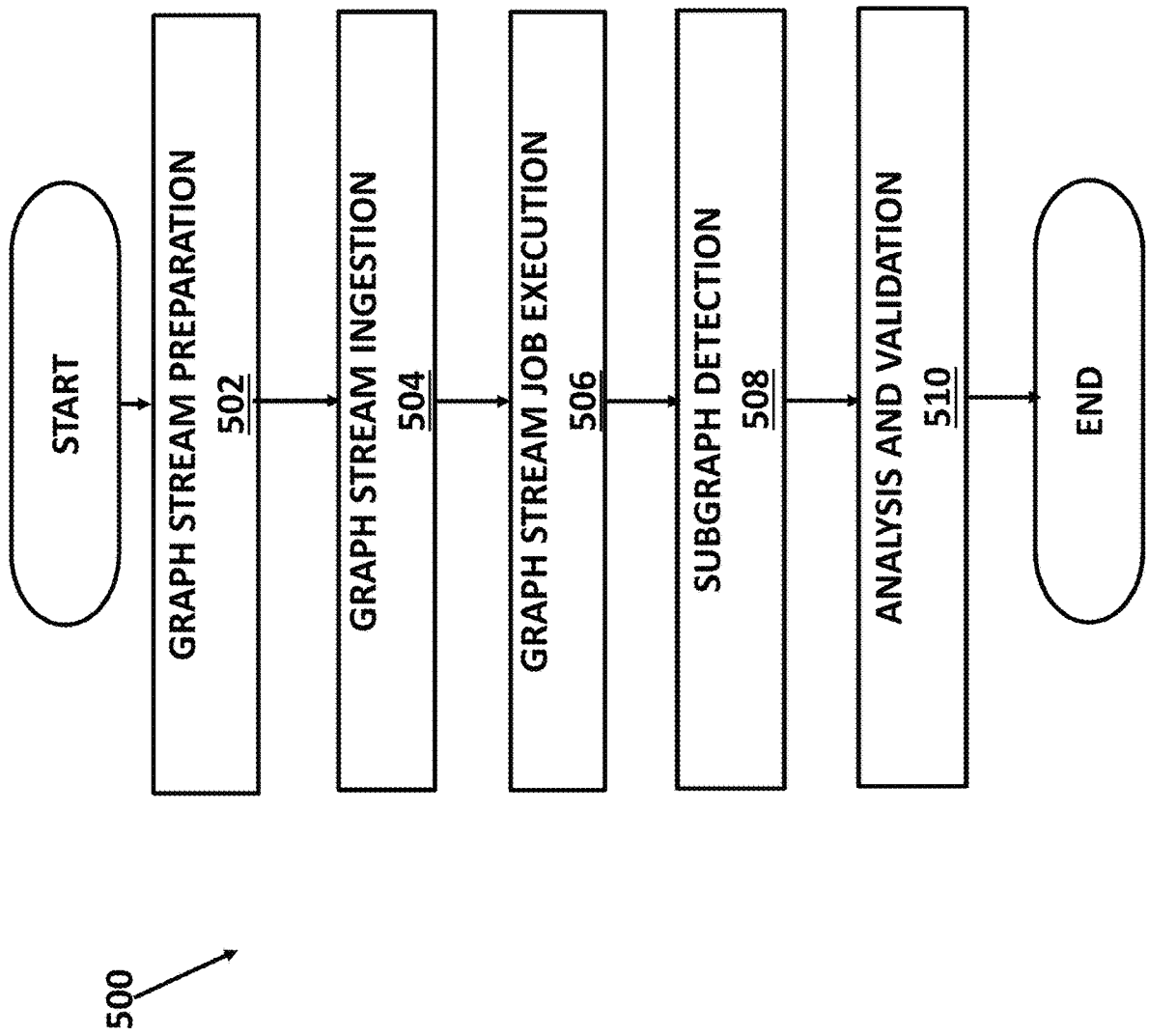
FIG. 5 illustrates a method for botnet detection using graph stream mining processing.

FIG. 5 illustrates a method 500 for botnet detection using graph stream mining processing. The method may be performed by the system shown in FIGS. 2 and 4A-4B, but may also be performed by other computer systems with a processor in which the processor executes a plurality of lines of computer code in a software embodiment or by other hardware elements such as microprocessors, GPUs, data processors, etc. in a hardware embodiment. In the method, network flow data (that may be the raw data streams shown in FIG. 4A) may be graph streams that are analyzed to detect botnets using a series of processes. A first process 502 may be graph stream preparation during which the user prepares and inputs job requests, seed nodes, and seed subgraph matching rules to the system, such as the example system shown in FIGS. 4A and 4B. A job description/request describes a job to be executed in the Graph stream processing module/system. For example, a job description may be to collect and store the network flow data that include traffic via Port 447 that is often used in a botnet attack. Another example of a job (that may be one of the custom jobs performed) is to collect and store the network flow data that includes hosts that have more flow per second that a given threshold which makes those hosts candidates for being part of a botnet. The job descriptions may be submitted through the API server of the graph stream processing system. Each seed node is an IP address (e.g., 94.23.252.37 as shown in FIG. 3) of each known C&C server of the Trickbot malware when the system is being used to detect the malicious computers of the Trickbot malware.

Figure 6:
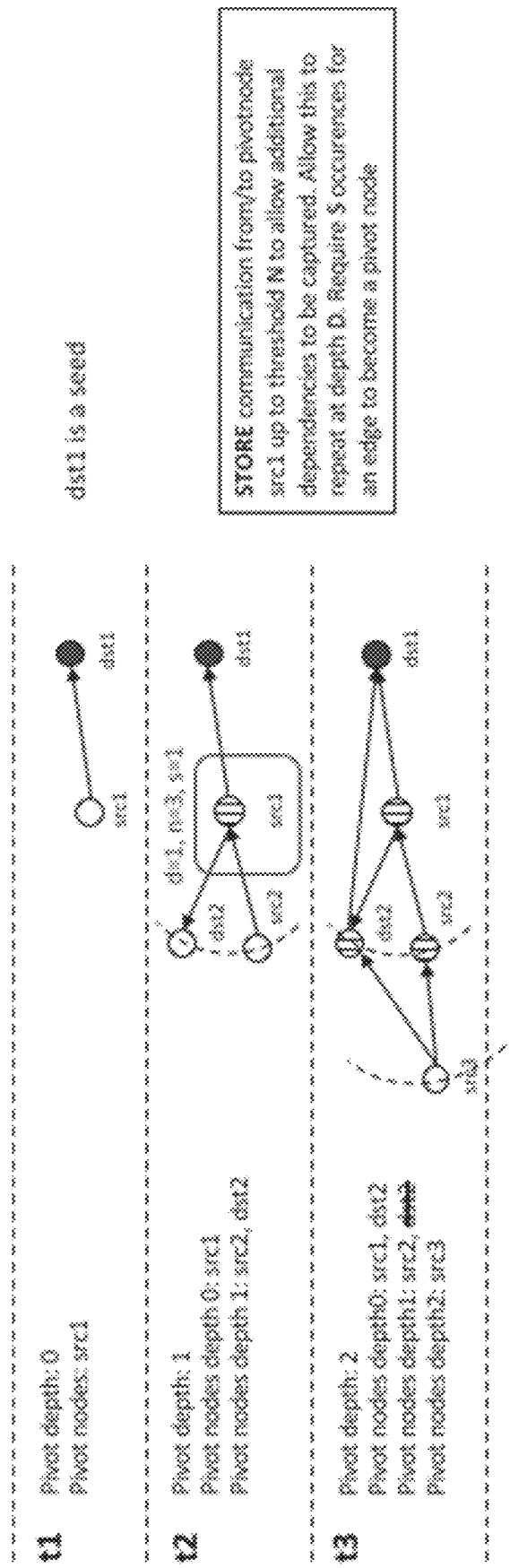
FIG. 6 illustrates an example of a set of seed subgraph matching rules that may be input into the graph stream processing method.

A Seed subgraph matching rule defines a set of conditions that detect a subgraph of interest in the network flow data represented as the graph stream. For example, a rule detects a C&C server candidate which has more than a certain threshold amount of traffic with the seed nodes. FIG. 6 illustrates an example of a set of seed subgraph matching rules 600 that may be input into the graph stream processing method. As shown, the set of seed subgraph matching rules may use a pivot node structure from a seed node that is dst1 in the example in FIG. 6. The set of seed subgraph matching rules may detect nodes in the network flow data found within the pivotnode structure and those nodes are candidates for the botnet infrastructure. Using the pivotnode structure (described below in more detail), the communications in each network flow data stream from/to a first pivotnode, such as src1 in the example in FIG. 6, up to a threshold N are stored to allow additional dependencies to be captured. Furthermore, the communications are stored at depth D. S occurrences may indicate that an edge becomes a pivot node. The value N determines the number of inbound and outbound edges to store in the graph (and thus consider at next level as pivot candidates). The algorithm remains the same but gets computationally more heavy with larger values of N. D sets a limit on how "deep" the graph can get based on a single seed, ie, it's the max distance (relationship links) from the seed we are interested in. A higher value of S instead requires more continuous relationships between the nodes to allow them to expand into pivot nodes, ie, grows the graph structure slowly.

In the example in FIG. 6, the set of seed subgraph matching rules may have a first phase at t1 at depth 0, a second phase at t2 at depth 1 and a third phase at t3 at depth 2. Each node has a label, such as src1, derived from the network flow data, but each node also has it IP address label. For example, the src1 node may have the xxx.23.23.23 IP address shown in the example in FIG. 8. In the first phase, src1 node (a pivotnode) is associated with the seed node, dst1. The src1 pivot node is determined based on the threshold amount of traffic in the network flow data with the seed node, dst1. In the second phase at pivot depth 1, src2 and dst2 nodes are identified. In the third phase at pivot depth 2, src3 is identified as a pivot node at depth 2 and dst2 is moved from depth 1 to depth 0 because a direct path as shown in FIG. 6 has been identified between dst2 and dst1.

During the preparation process 502, the user also prepares the network flow data feeds and feed them into the Graph stream processing module. Such data can be collected from network devices, e.g., routers. The external information may be used to validate the analysis results in the Analysis module as shown in FIG. 4B. As described below, an example of external source is the well-known Virus Total data. The Virus Total (VT) indicates if a given IP address is malicious or not. By comparing the results of the graph stream mining system with results from VT, the system can check if the prediction from the disclosed system is the same with VT. The match with VT may be used to benchmark the results of the graph stream mining system. For example, it was found that the results from the graph stream mining system preceded VT findings by more than two weeks in same cases.

Returning to FIG. 5, the method may ingest the graph stream data 504. In particular, the network flow data in the netflow format may be continuously fed into the Messaging queue 400 of the system shown in FIGS. 4A and 4B. Once the netflow data (in the form a graph streams) are ingested, the method may execute the jobs 506 of the user. In particular, custom jobs and the Seed subgraph generation job pull the data from the Messaging queue 400, collect the data that match with the job description, and construct the subgraphs from the collected data as shown in FIGS. 6 and 7A-7C. Then the API server 406 of the system may make the subgraphs accessible to the other modules (the subgraph detector 408 and/or the analysis module 410) through dedicated URLs via HTTPS with proper credentials in a well known manner.

The method may then perform a subgraph detection process 508. During this process, the Subgraph detection module 408 filters out victims and benign computers in the Seed subgraph store by applying one or more Noise reduction rules. For example, a Noise reduction rule is to detect and rule out consumers' computers that show typical consumer web browsing traffic patterns including accessing to popular Web sites, such as the Google search site. This process 508 may then apply the one or more Subgraph detection rules to the data in the Seed subgraph store connected to the storage manager 404 to detect C&C server and botmaster candidates in the botnet detection example being used for illustration purposes.

Figure 7:
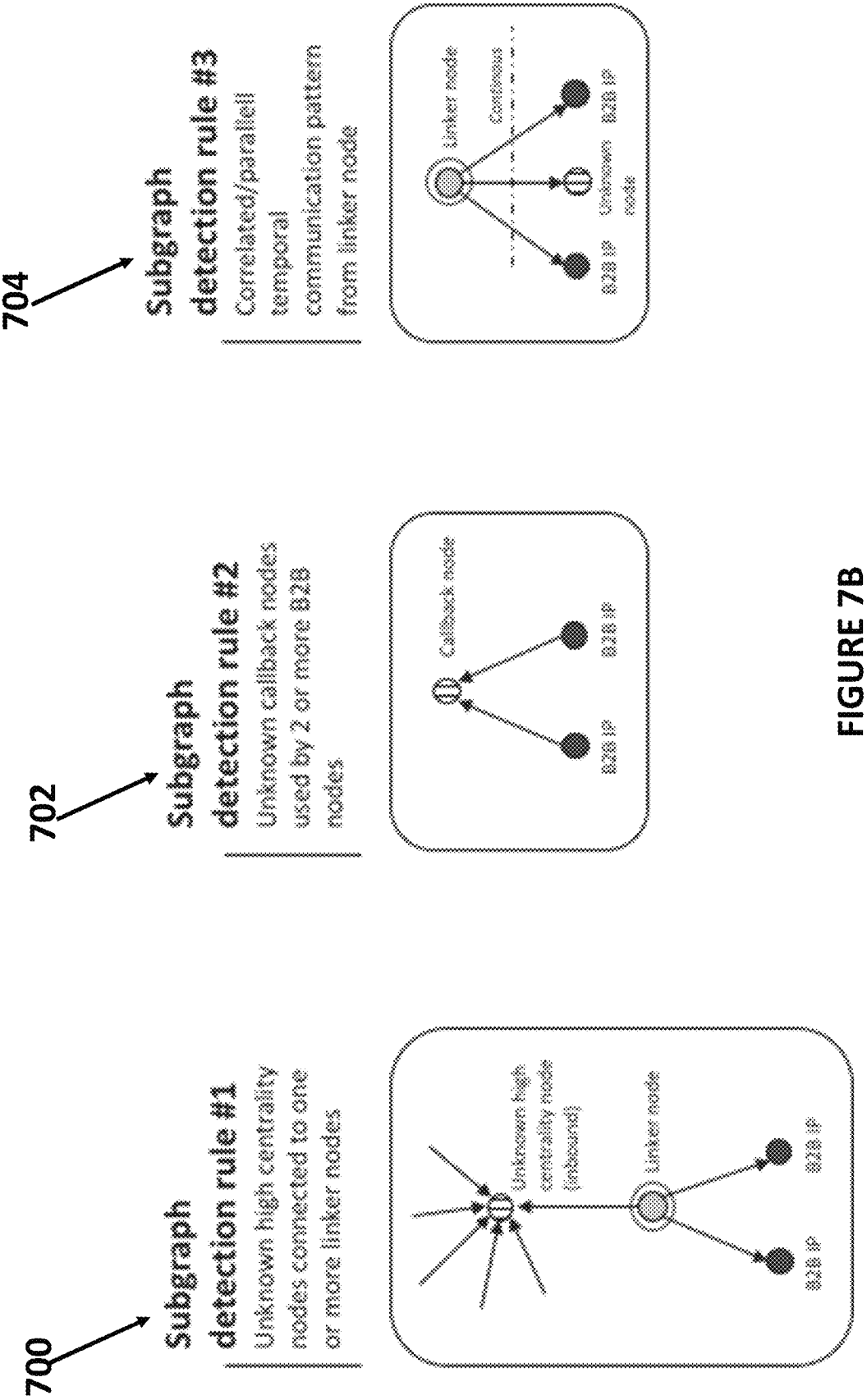
FIGS. 7A-7C illustrate examples of subgraph detection rules that may be implemented by the graph stream mining processing system.

FIGS. 7A-7C illustrate examples of subgraph detection rules 700, 702, 704 that may be implemented by the graph stream mining processing system. In the method, one or more of these subgraph detection rules may be applied to each data in the seed subgraph store connected to the storage manager 404 to identify the relevant subgraphs. The first subgraph detection rule 700 may identify a subgraph having an unknown high centrality node (a node with a plurality of inbound network data flows) that are connected to known malicious nodes (B2B IP nodes in FIG. 7A) by one or more intermediate/linker nodes as shown in FIG. 7A. Each linker node in a subgraph is a node whose maliciousness/participation in the botnet is known and somehow links an unknown node to the known botnet nodes/IP addresses. Each unknown node is a node that is not known to be malicious at the time that the method is being performed.

The second subgraph detection rule 702 may identify a subgraph having an unknown callback node used by two or more known malicious/botnet nodes (B2B IP nodes in the example). The unknown call back node is a node whose status as being malicious/part of the botnet is unknown and to which the two or more botnet nodes call back based on the network flow data. The callback node, in the botnet example, is a candidate to be the botmaster of the botnet.

The third subgraph detection rule 704 may identify a subgraph having a correlated/parallel temporal communication pattern from a linker node. In the example shown in FIG. 7C, the linker node has continuous communications with known malicious nodes (B2B IP in the example) and an unknown node. Each of the subgraphs thus identity at least one unknown node that is candidate for a botnet node/malicious node. In one example, the linker node may be the known botmaster and the unknown node may be a C&C server being controlled by the botmaster.

Returning to FIG. 5, once the subgraphs have been identified, the method may perform analysis and validation 510. In the botnet example being used for illustration purposes, the analysis and validation may generate the one or more unknown candidate nodes that are likely to be part of the botnet. In more detail using the system in FIGS. 4A and 4B, this process 510 gets results from the Custom jobs from the API module 406 and the results from the Subgraph detection module, and then correlates these results to create a set of final candidates. The correlation is done by performing the logical conjuncture of sets of IP addresses included in custom job results and subgraph detection results. An example of that correlation in shown in FIG. 11 in which the botmaster is identified by an outbound edge from TRICKBOT_C2_MCCONF to TRICKBOT_LAYER2 to the actual botmaster. Once the final candidates are identified, the final candidates are validated with the external sources, such as Virus Total, a commercial malware information site. The validation is done automatically. A program module (or script) gets the data for validation from external data sources through the sources' APIs and compare the analysis results with the external data.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method for botnet node detection, comprising:
receiving a plurality of network data flows, each network data flow containing data about a data communication between a source node having a first IP address and a destination node having a second IP address, network data flows including a botnet node known to be part of the botnet and an unknown node;
simultaneously extracting, from the plurality of network data flow, a plurality of network data flow data streams;
generating a graph for each network data flow data stream, the graph having the source node and the destination node and an edge between the source and destination nodes that represents a data communication between the source and destinations nodes generated based on the plurality of network data flow data streams;
generating, at least one seed subgraph from the plurality of network data flow data streams, the at least one seed subgraph having a seed node that is the botnet node and one or more unknown nodes that communicate with the seed node as determined by the generated graphs, the generating of the at least one seed subgraph further comprising identifying at least one unknown node that communicates with the seed node at a first pivot depth and identifying at least one unknown node at a second pivot depth that communicated with the at least one node at the first pivot depth; and
performing a set of subgraph detection rules using the at least one generated seed subgraph to detect one or more subgraphs including at least one botnet node and at least one candidate node, the candidate node being a candidate node for the botnet.

2. The method of claim 1, wherein generating the at least one seed subgraph further comprises moving the one unknown node at the second pivot depth to the first pivot depth if the one unknown node at the second pivot depth communicates directly with the seed node.

3. The method of claim 1, wherein performing a set of subgraph detection rules further comprises identifying a subgraph having a high centrality unknown node being the destination node for a predetermined number of network data flows, the high centrality unknown node being the destination node for a communication with a linker node that is the source node for a communication with one or more botnet nodes.

4. A method for botnet node detection, comprising:
receiving a plurality of network data flows, each network data flow containing data about a data communication between a source node having a first IP address and a destination node having a second IP address, network data flows including a botnet node known to be part of the botnet and an unknown node;
simultaneously extracting, from the plurality of network data flow, a plurality of network data flow data streams;
generating a graph for each network data flow data stream, the graph having the source node and the destination node and an edge between the source and destination nodes that represents a data communication between the source and destinations nodes generated based on the plurality of network data flow data streams;
generating, at least one seed subgraph from the plurality of network data flow data streams, the at least one seed subgraph having a seed node that is the botnet node and one or more unknown nodes that communicate with the seed node as determined by the generated graphs; and
performing a set of subgraph detection rules using the at least one generated seed subgraph to detect one or more subgraphs including at least one botnet node and at least one candidate node, the candidate node being a candidate node for the botnet, wherein performing a set of subgraph detection rules further comprises identifying a subgraph having an unknown callback node being the destination node for communications with one or more botnet nodes.

5. The method of claim 1, wherein performing a set of subgraph detection rules further comprises identifying a subgraph having an unknown linker node wherein the unknown linker node is the source node for communications with at least one botnet node and an unknown node.

6. A system, comprising:
a data stream mining system that receives a plurality of network data flows, each network data flow containing data about a data communication between a source node having a first IP address and a destination node having a second IP address, network data flows including a botnet node known to be part of the botnet and an unknown node;
the data stream mining system having a messaging queue that generates a plurality of jobs executed simultaneously that extracts, from the plurality of network data flow, a plurality of network data flow data streams, generates a graph for each network data flow data stream, the graph having the source node and the destination node and an edge between the source and destination nodes that represents a data communication between the source and destinations nodes generated based on the plurality of network data flow data streams and generates, at least one seed subgraph from the plurality of network data flow data streams, the at least one seed subgraph having a seed node that is the botnet node and one or more unknown nodes that communicate with the seed node as determined by the generated graphs;
the data stream mining system having a subgraph detection unit coupled to the messaging queue, the subgraph detection unit performs a set of subgraph detection rules using the at least one generated seed subgraph to detect one or more subgraphs including at least one botnet node and at least one candidate node, the candidate node being a candidate node for the botnet; and
wherein the messaging queue identifies at least one unknown node that communicates with the seed node at a first pivot depth and identifies at least one unknown node at a second pivot depth that communicated with the at least one node at the first pivot depth.

7. The system of claim 6, wherein the messaging queue moves the one unknown node at the second pivot depth to the first pivot depth if the one unknown node at the second pivot depth communicates directly with the seed node.

8. The system of claim 6, wherein the subgraph detection unit identifies a subgraph having a high centrality unknown node being the destination node for a predetermined number of network data flows, the high centrality unknown node being the destination node for a communication with a linker node that is the source node for a communication with one or more botnet nodes.

9. A system, comprising:
a data stream mining system that receives a plurality of network data flows, each network data flow containing data about a data communication between a source node having a first IP address and a destination node having a second IP address, network data flows including a botnet node known to be part of the botnet and an unknown node;
the data stream mining system having a messaging queue that generates a plurality of jobs executed simultaneously that extracts, from the plurality of network data flow, a plurality of network data flow data streams, generates a graph for each network data flow data stream, the graph having the source node and the destination node and an edge between the source and destination nodes that represents a data communication between the source and destinations nodes generated based on the plurality of network data flow data streams and generates, at least one seed subgraph from the plurality of network data flow data streams, the at least one seed subgraph having a seed node that is the botnet node and one or more unknown nodes that communicate with the seed node as determined by the generated graphs;
the data stream mining system having a subgraph detection unit coupled to the messaging queue, the subgraph detection unit performs a set of subgraph detection rules using the at least one generated seed subgraph to detect one or more subgraphs including at least one botnet node and at least one candidate node, the candidate node being a candidate node for the botnet; and
wherein the subgraph detection unit identifies a subgraph having an unknown callback node being the destination node for communications with one or more botnet nodes.

10. The system of claim 6, wherein the subgraph detection unit identifies a subgraph having an unknown linker node wherein the unknown linker node is the source node for communications with at least one botnet node and an unknown node.

* * * * *